Sept. 28, 1926. 1,601,177
J. A. KNAPIK
RESILIENT WHEEL
Filed Dec. 26, 1923

John A. Knapik
INVENTOR

BY  Harpman
ATTORNEY

Patented Sept. 28, 1926.

1,601,177

UNITED STATES PATENT OFFICE.

JOHN A. KNAPIK, OF STRUTHERS, OHIO.

RESILIENT WHEEL.

Application filed December 26, 1923. Serial No. 682,634.

This invention relates to resilient wheels, for automobiles and other vehicle wheels, and has for its object, to provide a comparatively simple and thoroughly efficient device of this character, especially designed to take the place of the ordinary pneumatic tires, by providing a yieldable tread surface to the ground, and insure comfort in riding without liability of puncture, and the resultant delay and annoyance incident to repairing the puncture.

A further object is to provide a resilient wheel, including a hinged outer rim, having a plurality of sets of coiled springs secured thereto, and which serve to yieldably support said hinged outer rim in spaced relation to the felly of the wheel.

A further object is to provide a plurality of rubber cushions secured to the outer circumference of the felly, and functioning with depending metallic lugs placed directly over said rubber cushions, both rubber cushions and metallic lugs being surrounded by the above mentioned coiled springs.

A further object of this invention is to provide changeable tread blocks, some of them provided with non-skid lugs.

A still further object of this invention is to provide sets of chains functioning between the felly and hinged outer rim.

Other, an incidental objects will appear during the course of the detailed description of the invention. In the drawings, wherein I have illustrated the preferred embodiment of the invention, and wherein similar reference characters designate, corresponding parts throughout the several views:

Figure 2 is a top plan view of a portion of tread surface of the device.

Figure 1:
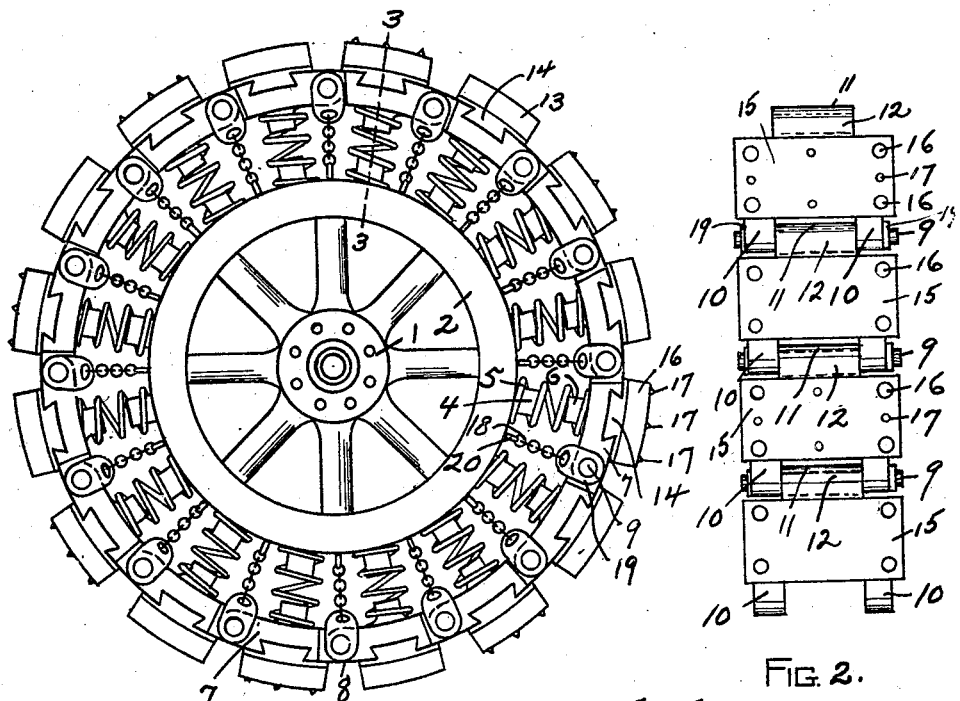
Figure 1 is a side elevation of the device.

By referring to Figure 1, it will be seen that I have provided a wheel 1, having a felly 2 which is constructed somewhat wider than ordinary fellies. Secured to the outer circumference of this felly 2, I have provided metal retaining cups 3 for the purpose of securing circular rubber cushions 4 to the outer circumference of the felly 2 in pairs, and crosswise to the felly 2. It will also be seen that I have provided coiled springs 5 which surround the metal retaining cups 3 and the circular rubber cushions 4. The outer ends of these coil springs 5 surround depending circular metallic lugs 6 which are formed underneath each section 7 of the hinged outer rim 8.

Figure 4:
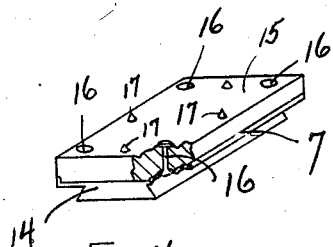
Figure 4 is a detailed view of one of the interchangeable tread blocks of the device.
Figure 3:
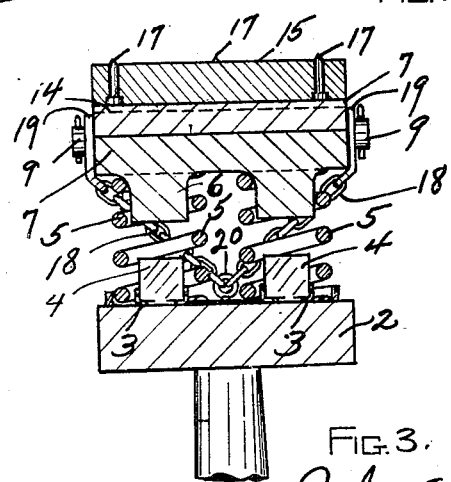
Figure 3 is a sectional view taken on line 3—3 of Figure 1.

By referring to Figure 2, it will be seen that these sections 7 are hinged by means of hinge pins 9 passing through hinge portions 10 and 11, formed at the ends of each section 7. It will also be seen that the hinge portions 11 are provided with elongated openings 12 through which the hinge pins 9 pass in order that the sections 7 may vary in their lineal position to each other in order to provide means for allowing the coiled springs 5 to function in order to give resiliency to the wheel. The sections 7 of the outer rim 8 are provided with tread blocks 13 which comprise a metal dove-tailed base portion 14 and a rubber tread portion 15 secured to said dove-tailed base portion 14, by means of rivets 16. (See Figure 4).

In order to provide means for preventing the wheel from skidding, I have provided metal lugs 17 which project through the outer surface of the tread portions 15.

In order to strengthen and keep the hinged outer rim 8 in a position relative to the coiled springs 5 and the parts surrounded by the same, I have provided chains 18, the outer ends of which are secured to the outer ends of the hinge pins 9 by means of a chain securing member 19. The inner ends of each pair of said chains 18 are secured to a common eye pin 20, which is, in turn, secured to the felly 2.

The chains 18 tend to carry the weight subjected to the wheel 1, when they are in the upper circumference of the wheel, and due to this, tend to cause the sections 7 to take positions relatively closer to each other, thereby, allowing for a spreading of the sections 7 in the lower circumference of the wheel 1. Now as the wheel 1 strikes or comes in contact with uneven portions of a road, the coiled springs 5 will be compressed and if an extremely sudden impression is made due to unevenness of the road, the metallic lugs 6 will come in contact with the circular rubber cushions 4 which will tend to cushion the jar that would otherwise result. It is evident that these circular rubber cushions 4 will also prevent extreme compressing of the coiled springs 5 and, thereby, lessen the probability of their breaking.

What I claim is:—

The combination with a wheel including a felly, a rim spaced from the felly and formed of a plurality of pivotally united sections, a pair of coil springs placed between said felly and each of said united sections, metal retaining cups for the purpose of functioning with said springs, a plurality of chains secured to each joining of said united sections and to said felly for the purpose of keeping said rim from taking a position without the edge of said felly, substantially as described for the purpose set forth.

In testimony whereof I affix my signature.

JOHN A. KNAPIK.